Feb. 23, 1926.
E. R. SKINNER ET AL
NUT SHELLING MACHINE
Filed Oct. 6, 1924
1,574,450
2 Sheets—Sheet 1
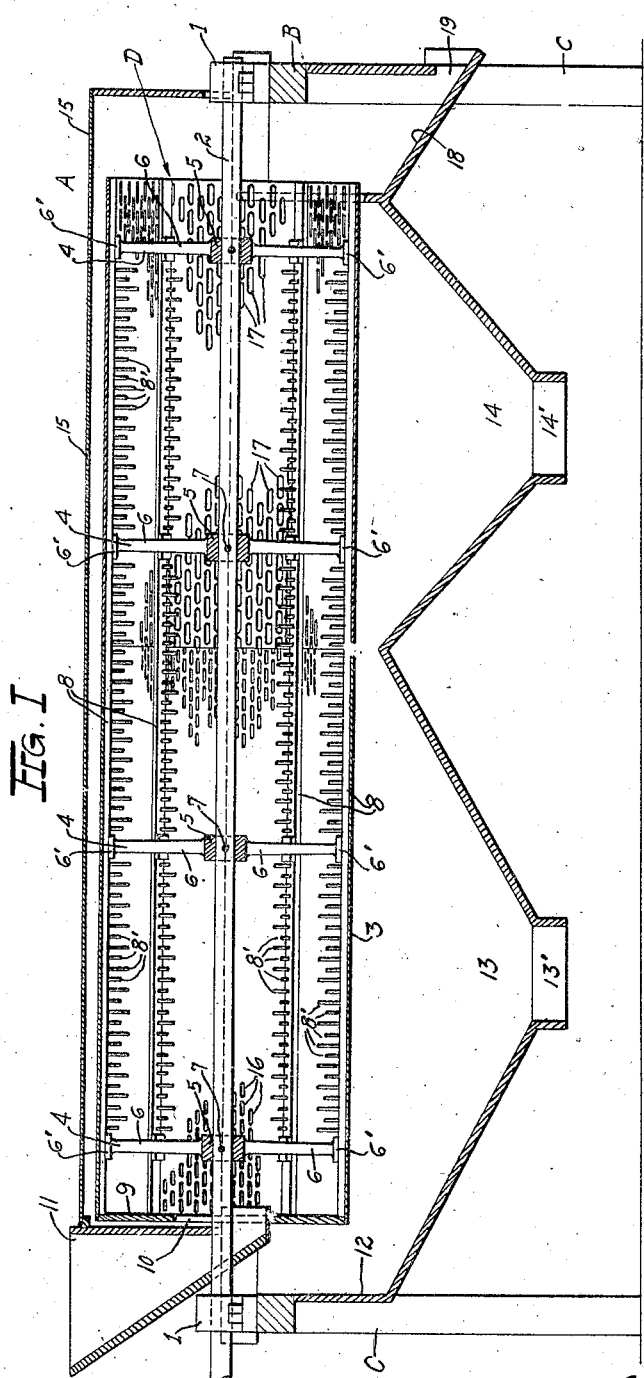
INVENTORS
EDGAR R. SKINNER
JOHN H. RENNE
EDWARD O. OSTERMEYER
BY Cool & McCauley
ATTORNEYS Feb. 23, 1926.
E. R. SKINNER ET AL
1,574,450
NUT SHELLING MACHINE
Filed Oct. 6, 1924
2 Sheets-Sheet 2
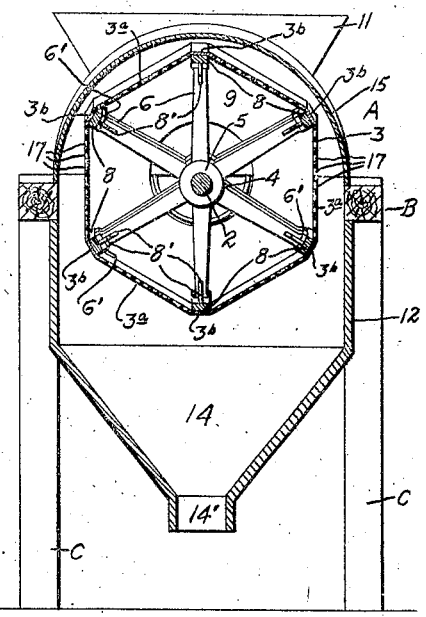
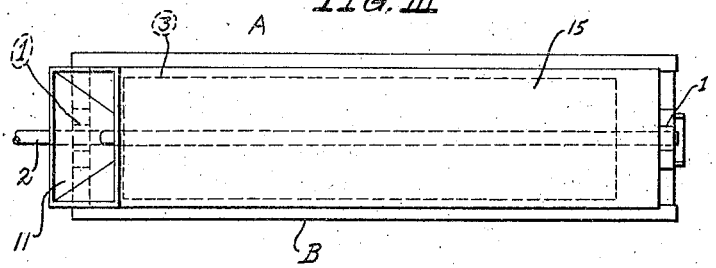
INVENTOR
EDGAR R. SKINNER
JOHN H. RENNE
EDWARD O. OSTERMEYER
BY Cook & McCauley
ATTORNEYS Patented Feb. 23, 1926.

1,574,450

UNITED STATES PATENT OFFICE.

EDGAR R. SKINNER, JOHN H. RENNE, AND EDWARD O. OSTERMEYER, OF ST. LOUIS, MISSOURI, ASSIGNORS TO BERNHART MERCANTILE COMPANY, A CORPORATION OF MISSOURI.

NUT-SHELLING MACHINE.

Application filed October 6, 1924. Serial No. 741,871.

*To all whom it may concern:*

Be it known that we, EDGAR R. SKINNER, JOHN H. RENNE, and EDWARD O. OSTERMEYER, citizens of the United States of America, and residents of the city of St. Louis, State of Missouri, have invented certain new and useful Improvements in Nut-Shelling Machines, of which the following is a full, clear, and exact description, reference being had to the accompanying drawings, forming a part of this specification.

This invention relates generally to nut shelling machines, and particularly to a machine which will remove the shells from the kernels of edible nuts after said shells of said nuts have been cracked by a machine or by hand. Prior to this invention, it has been the practice in most cases to shell edible nuts by hand after the shells of said nuts had been cracked. This method was found to be a slow and expensive one, and the main purpose of the present invention is to produce a machine into which cracked nuts may be placed and which will operate in a manner to separate the fragments of the shells of said nuts from the kernels thereof.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a longitudinal vertical section of our improved nut shelling machine.

Fig. II is a vertical cross section of the machine shown in Fig. I.

Fig. III is a plan view of our improved shelling machine.

In the drawing, A designates our improved shelling machine, which comprises a rectangluar frame B supported by a plurality of legs C. Arranged at the ends of the rectangular frame B is a pair of bearings 1, there being one of said bearings at each end of said frame, as shown in Figs. I and III. Supported in the bearings 1 and extended longitudinally of the machine is a shaft 2, said shaft having associated with it power-driven means (not shown) whereby said shaft may be rotated.

Mounted on the shaft 2 is an elongated drum 3 which is preferably made of sheet metal, said drum being non-circular in cross section, as shown in Fig. III. By referring to Fig. II it will be seen that the cross sectional shape of the drum 3 comprises a plurality of comparatively wide, flat faces $3^a$ and a plurality of relatively narrow, flat faces $3^b$. The drum 3 is supported on the shaft 2 by means of a plurality of spiders 4, each of which comprises a hub portion 5 and a plurality of radial arms 6 extending from said hub portion. The spiders 4 are secured to the shaft 2 by means of pins 7, or in any other suitable manner, so that said spiders rotate with said shaft.

The radial arms 6 of the spiders 4 extend toward the comparatively narrow flat faces $3^b$ of the drum 3, the outer ends of said radial arms being spaced apart slightly from said flat faces and the arms of the various spiders being arranged in longitudinal rows. Interposed between each individual row of spider arms and the adjacent comparatively narrow face $3^b$ is an elongated bar 8, there being six of these elongated bars shown in the drawing, though, of course, there may be more or less as the number of bars is immaterial in so far as the operation of the machine is concerned. At the outer end of each radial arm 6 of the spider is a flange 6', and suitable fastening devices are passed through said flanges, through the associated elongated bars 8, and through the adjacent comparatively narrow faces $3^b$ of the drum 3, whereby said drum, elongated bars and spiders are securely fixed together so that they will rotate as a unit. Each individual elongated bar 8 is provided with a plurality of inwardly extending pins 8', said pins preferably being made in two lengths, there being alternate long and short pins arranged longitudinally of said bars 8 as shown clearly in Fig. I. The rows of pins 8' extend practically the entire length of the drum 3 and are intended for a purpose to be hereinafter set forth.

The drum 3 is entirely open at what may be termed the discharge end D thereof, and said drum is provided with a wall 9 at its other, or intake, end, which wall is provided with a circular opening 10. Arranged at the intake end of the drum is a stationary hopper 11, said hopper being supported in any suitable manner by the rectangular frame B of the machine and being provided with a lower discharge end which extends through the circular opening 10 in the wall 9 so that nuts deposited in said hopper 11 will be discharged into the interior of the drum 3. 12 designates the lower portion of the housing of the machine, said housing portion being shaped to provide a pair of hoppers 13 and 14 having discharge openings 13' and 14' at their lower ends. 15 designates the cover portion of the housing of the machine, said cover portion being arranged to entirely cover the upper portion of the drum 3. The lower portion 12 and the cover portion 15 of the housing of the machine are, of course, stationary, said housing portions being supported by the rectangular frame B of the machine. Formed in the comparatively wide, flat portions 3ᵃ of the wall of the drum 3 is a plurality of apertures, the apertures 16 in the wall of the drum from the intake end thereof to an imaginary line at the approximate longitudinal center of the drum being comparatively small and the apertures 17 arranged between said imaginary line and the discharge end of the drum being much larger than the apertures 16. The apertures 16 and 17 extend from end to end of the drum 3, but to save needless work on the drawings we have shown these apertures only in spots. The drum 3 inclines downwardly from the intake end thereof to the discharge end thereof, so that any nuts which may be placed in said drum will be gradually moved toward the discharge end of the drum as it is rotated.

The operation of our improved nut-shelling machine is as follows:

Assume that the machine is in operation and that the shaft 2, together with the drum 3 thereon, is being rotated. Nuts, the shells of which have been previously cracked, are deposited in the hopper 11, whereby said nuts are introduced into the interior of the drum 3. These nuts will be tumbled about within the rotating drum 3, because of the non-circular cross-sectional shape of said drum and also because the pins 8' will act as baffles. After the nuts have been violently tumbled about for a period of time it is plain that the fragments of cracked shells of said nuts will be separated from the kernels thereof and these shell fragments will pass through the apertures 16 and into and through the hopper 13 to a receptacle located beneath the opening 13' of said hopper. The opening 16 are not large enough for the kernels of the nuts to pass through them and therefore the inclination of the drum will cause said kernels to travel toward the discharge end of the drum. When the kernels of the nuts reach the portion of the drum having the larger apertures 17, said kernels will pass through said apertures and will fall into the hopper 14 and pass through the discharge opening 14' of said hopper into a receptacle arranged thereunder. It may be that when some of the kernels pass through the larger openings 17 and into the receptacle beneath the hopper 14, small fragments of shells may be clinging to them, and if this is so it is apparent that it would be a very simple task to separate said kernels and said shell fragments by hand.

If uncracked nuts or kernels of such large size that they may not pass through the apertures 17 are encountered, said uncracked nuts or large kernels will pass entirely through the machine, being discharged at the open end D of the drum 3, where they will fall onto the inclined wall 18 and will pass from the machine through the opening 19.

We claim:

1. A nut-shelling machine comprising a rotatable drum into which the nuts are placed after the shells thereof have been cracked, and means comprising a plurality of pins extending inwardly from the wall of the drum whereby said nuts are tumbled about within said drum as it is rotated, the wall of said drum being provided with a group of apertures adjacent to one of its ends through which the fragments of the shells of nuts pass, and a group of larger apertures adjacent to the other end of said drum through which the kernels of said nuts pass, said drum being arranged at an inclination to cause the nuts therein to move toward one of its ends while the same is rotating.

2. A nut-shelling machine comprising a rotatable drum non-circular in cross section in which nuts are placed after the shells thereof have been cracked, means comprising a plurality of various sized pins extending inwardly from the wall of said drum whereby said nuts are tumbled about within said drum as it is rotated, the wall of said drum being provided with a group of apertures adjacent to one of its ends through which the fragments of the shells of said nuts pass, and a group of larger apertures adjacent to the other end of said drum through which the kernels of nuts pass, said drum being arranged at an inclination to cause the nuts therein to move toward the group of larger apertures while said drum is rotating, and a pair of hoppers one of which is arranged below the smaller apertures and the other below the larger apertures in the wall of the drum.

3. A nut-shelling machine comprising a rotatable drum non-circular in cross section in which the nuts are placed after the shells thereof have been cracked, means comprising a plurality of various sized pins arranged within said drum whereby said nuts are tumbled about as said drum is rotated, longitudinally extending bars within said drum by which said pins are supported, the wall of said drum being provided with a group of apertures adjacent to one of its ends through which the fragments of the shells of said nuts pass, and a group of larger apertures adjacent to the other end of said drum through which the kernels of said nuts pass, said drum being arranged at an inclination to cause the nuts therein to move toward the group of larger apertures while said drum is rotating, a pair of hoppers one of which is arranged below the smaller apertures and the other below the larger apertures in the wall of the drum, and means whereby nuts and fragments thereof which do not pass through said apertures in the wall of the drum may pass from the machine at one end thereof.

In testimony that we claim the foregoing we hereunto affix our signatures.

EDGAR R. SKINNER.
JOHN H. RENNE.
EDWARD O. OSTERMEYER.

Certificate of Correction.

It is hereby certified that the name of the assignee in Letters Patent No. 1,574,450, granted February 23, 1926, upon the application of Edgar R. Skinner, John H. Renne, and Edward O. Ostermeyer, of St. Louis, Missouri, for an improvement in "Nut-Shelling Machines," was erroneously written and printed as "Bernhart Mercantile Company," whereas said name should have been written and printed as *Barnhart Mercantile Company*, as shown by the records of assignments in this office; and that the said Letters Patent should be read with this correction therein that the same may conform to the record of the case in the Patent Office.

Signed and sealed this 23d day of March, A. D. 1926.

[SEAL.]

M. J. MOORE,
*Acting Commissioner of Patents.*